United States Patent
Brinley

[11] Patent Number: 6,129,800
[45] Date of Patent: Oct. 10, 2000

[54] PROCESS FOR PREPARING EMBOSSED METAL FOIL LAMINATE

[75] Inventor: Charles E. Brinley, Addison, Mich.

[73] Assignee: K2, Inc., Adrian, Mich.

[21] Appl. No.: 08/353,916

[22] Filed: Dec. 12, 1994

[51] Int. Cl.$^7$ .............................. B32B 31/20; B32B 31/30
[52] U.S. Cl. ............... 156/209; 156/244.11; 156/244.24; 156/244.27; 264/177.17; 264/284
[58] Field of Search .................... 156/244.11, 244.24, 156/244.27, 209, 219, 324; 264/177.17, 210.1, 211.12, 284

[56] References Cited

U.S. PATENT DOCUMENTS

| | | | |
|---|---|---|---|
| 3,075,864 | 1/1963 | Anderson | 156/244.11 |
| 4,657,614 | 4/1987 | Anderson | 156/244.11 |
| 5,098,497 | 3/1992 | Brinley . | |

OTHER PUBLICATIONS

Webster's New Collegiate Dictionary, p. 577, 1973.

*Primary Examiner*—Richard Crispino
*Attorney, Agent, or Firm*—Donald R. Fraser

[57] ABSTRACT

An embossed metal foil laminate is prepared by laminating a metal foil to a paper web, utilizing an extrusion coated resin interlayer therebetween, by passing the layered structure between a nip roll and an engraved chill roll. The metal foil quickly conducts heat energy from the molten resin layer to the chill roll, allowing the process to be run at a high speed. The engraved chill roll impresses a pattern into the metal foil during the lamination operation.

20 Claims, 1 Drawing Sheet

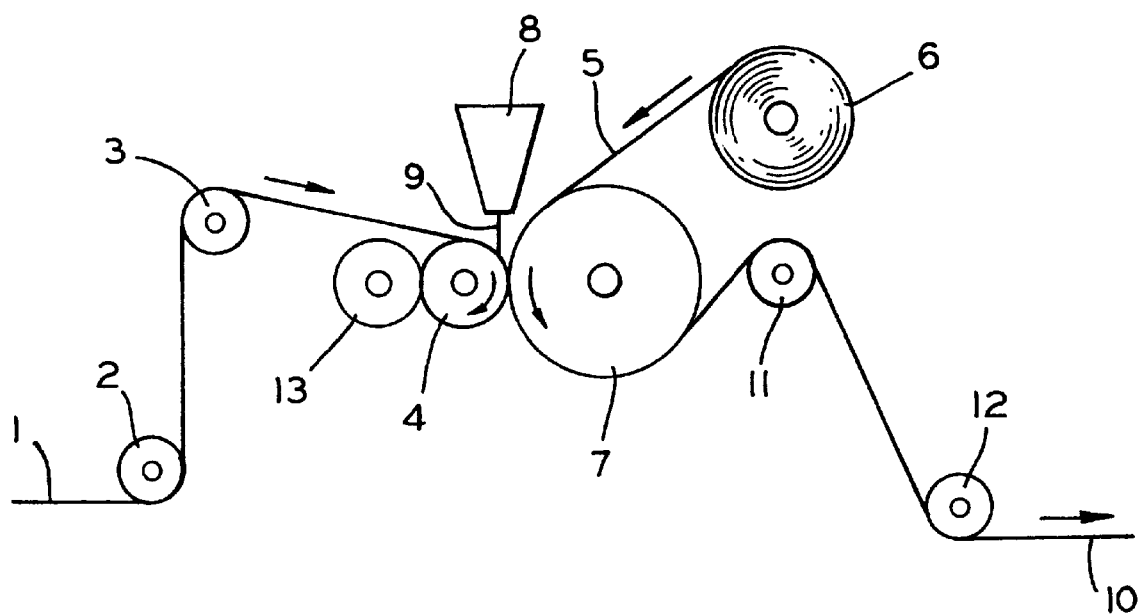

PROCESS FOR PREPARING EMBOSSED METAL FOIL LAMINATE

FIELD OF THE INVENTION

This invention relates generally to a process for preparing an embossed metal foil laminate. More particularly, the invention is directed to a process for laminating a metal foil to a paper web utilizing an extrusion coated resin interlayer therebetween while simultaneously embossing the metal foil.

BACKGROUND OF THE INVENTION

Embossed or textured metalized panels are used in a wide variety of products, especially building and construction products where an aesthetically pleasing metallic surface is desired. Such products may be prepared from relatively thick metal sheets which have been embossed on one major surface, but this results in a costly product produced by a complex process. It is also known to laminate a pre-embossed metal foil to a relatively inexpensive backing material to form a metalized sheet stock from which decorative panels may be made.

DESCRIPTION OF THE PRIOR ART

U.S. Pat. No. 5,098,497 discloses a process for preparing an embossed coated paper product. A polymer film is laminated to a paper web using an extrusion coated resin interlayer. The insertion of the molten resin between the polymer film and paper web heats the polymer film above its plastic set temperature. Thus, when the exposed surface of the polymer film contacts the engraved chill roll, the surface of the engraved chill roll impresses the heat-softened polymer film, thereby transferring the surface pattern of the embossed chill roll to the surface of the polymer film. The patent lists several alternative polymers from which the polymer film may be produced, each of which may be softened to receive a surface impression by heating above its plastic set temperature.

It must be noted that the prior art referred to hereinabove has been collected and examined only in light of the present invention as a guide. It is not to be inferred that such diverse art would otherwise be assembled absent the motivation provided by the present invention, nor that the cited prior art when considered in combination suggests the present invention absent the teachings herein.

It would be desirable to devise a method for preparing an embossed metal foil laminate having sufficient structural integrity for preparing decorative panels.

SUMMARY OF THE INVENTION

Accordant with the present invention, a process for preparing an embossed metal foil laminate has surprisingly been discovered. The process comprises the steps of:

providing a web of paper;

providing a metal foil;

extrusion coating a layer of molten resin onto the web of paper;

contacting the metal foil to the layer of molten resin, to form a layered structure comprising consecutively, the web of paper, the layer of molten resin, and the metal foil; and passing the layered structure between a nip roll and an engraved chill roll, to laminate the layered structure, conduct heat from the molten resin quickly through the metal foil to the chill roll to solidify the resin, and emboss the metal foil.

The process of the present invention is particularly useful for preparing an embossed metal foil laminate which can be used for making decorative panels.

Further objects and advantages of this invention will be apparent from the following description and appended claims, reference being made to the accompanying drawings forming a part of the specification, wherein like reference characters designate corresponding parts in the several views.

BRIEF DESCRIPTION OF THE DRAWING

The FIGURE is a schematic representation of an embodiment of the process of the present invention, illustrating the laminating, extrusion coating, and embossing operations.

DESCRIPTION OF THE PREFERRED EMBODIMENTS

Referring now to the FIGURE, there is shown a schematic representation of a process according to the present invention. A web 1 of paper advances from a supply roll (not shown) over consecutive guide rolls 2 and 3 and onto a nip roll 4. Simultaneously, a metal foil 5 advances from a supply roll 6 onto an engraved chill roll 7. A resin is melted in a conventional extruder (not shown), extruded through a T-die 8 in the form of a sheet of molten resin 9, and deposited onto the web 1 of paper. The web 1 of paper, having the layer of molten extrusion coated resin thereon, and the metal foil 5 are pressed together between the nip roll 4 and the engraved chill roll 7, and are thereby laminated. Simultaneously, the engraved chill roll 7 impresses its engraved pattern into the metal foil 5. The embossed metal foil laminate 10 is then parted from the engraved chill roll 7, passed over consecutive guide rolls 11 and 12, and accumulated onto a take-up roll (not shown). The laminating pressure between the nip roll 4 and the engraved chill roll 7 is adjusted and maintained by contacting the nip roll 4 against a pressure back-up roll 13. The pressure back-up roll 13 is not required for adequately laminating and embossing the assemblage. In a preferred embodiment, adequate pressure may be achieved between the nip roll 4 and the embossed chill roll 7 without the use of the pressure back-up roll 13.

The web 1 of paper suitable for use according to the present invention may include, but is not necessarily limited to, Kraft paper, natural or synthetic pulp paper, paperboard, linerboard, cardboard, and the like, as well as laminates thereof. The thickness of the paper web 1 may range from about 5 mils to about 300 mils. Preferably, the web 1 of paper comprises Kraft paper having a thickness from about 10 mils to about 100 mils.

Suitable metal foils 5 according to the present invention include, but are not necessarily limited to, foils made from aluminum, stainless steel, tin, and the like, as well as alloys thereof. The metal foil a, may have a thickness ranging from 0.0001 mil to about 1 mil. Preferably, the metal foil 5 is aluminum foil having a thickness from about 0.00015 mil to about 0.4 mil.

The sheet of molten resin 9 may be formed by extruding conventional polymeric materials including, but not necessarily limited to, low, medium, or high density polyethylene, polypropylene, polyester, polyurethane, polyamide, polyvinyl chloride, and the like, as well as blends and copolymers thereof. A preferred resin comprises low, medium, or high density polyethylene.

The nip roll 4 may be a rubber or rubber-covered roll, having a Durometer hardness from about 30 to about 75.

This range of hardness allows the engraved portion of the chill roll 7 to effectively impress and mechanically distort the metal foil 5, thereby transferring the engraved pattern of the chill roll 7 to the metal foil 5 during the lamination process. The pressure between the nip roll 4 and the engraved chill roll 7 is generally from about 10 pounds per linear inch to about 200 pounds per linear inch. Preferably, the pressure is between about 50 and about 150 pounds per linear inch. A preferred process employs a rubber or rubber-covered nip roll 4 having a Durometer hardness of about 60, which is urged toward the engraved chill roll 7 at a pressure from about 80 to about 100 pounds per linear inch.

The surface of the chill roll 7 may be prepared by etching with an appropriate conventional acid solution to prepare the desired surface pattern having a depth from about 1.5 mils to about 5 mils. Alternatively or additionally, the surface of the chill roll 7 may be sandblasted to produce a matte surface finish having an RMS value, for example, from about 80 to about 100. Finally, the surface of the chill roll 7 may be plated, for example with chromium, to harden and protect same. The chill roll 7 may be cooled by any conventional technique such as, for example, by passing a cooling medium, e.g., water, therethrough. During operation, the temperature of the chill roll 7 is generally maintained from about 65° F. to about 180° F.

The resin may be melted in any conventional extrusion device and discharged through the T-die 8 to form a descending sheet of molten resin 9 which deposits onto the advancing web 1 of paper. The descending sheet of molten resin 9 may have a thickness from about 0.3 to about 5 mils. The temperature of the molten resin will, of course, depend upon several factors, including what type of resin is used, as is well-known to those ordinarily skilled in the art. In order to provide the correct thickness of extruded resin for preparing the embossed metal foil laminate 10, the extrusion rate must be coordinated with the advancement rates for the web 1 of paper and the metal foil 5. Typical running speeds for the instant invention may range from about 100 feet per minute to about 1,000 feet per minute. Preferably, the running speed is from about 500 to about 700 feet per minute.

As the paper web 1, having the layer of molter resin thereon, and the metal foil 5 enter the nip, the metal foil 5 contacts the molten resin layer and is adhered thereto forming a composite structure. The metal foil 5 immediately conducts heat from the molten resin layer to the chill roll 7, causing the molten resin layer to harden. Simultaneously, the engraved chill roll 7 impresses its surface pattern into the metal foil 7, deforming it to conform to the surface pattern of the engraved chill roll 7. Thus, in the nip, the layers are laminated and the metal foil 5 is embossed. Because the layer adjacent the chill roll 7 is a metal foil 5, heat is quickly conducted away from the molten resin layer, thereby allowing the present process to be operated at a higher speed than conventional lamination processes which employ extrusion coated resin layers.

EXAMPLE

Kraft paper having a thickness of about 9 mils and aluminum foil having a thickness of about 0.0002 mil are simultaneously fed into the nip formed between a rubber nip roll having a Durometer hardness of about 60 and an engraved, chromium plated chill roll. The running speed of the operation is about 500 feet per minute. High density polyethylene resin is extrusion coated at a temperature of about 650° F., forming a sheet of molten polyethylene resin which descends onto the moving paper web substantially at the nip. The resultant layer of molten polyethylene entering the nip is about 0.5 mil. The layers entering the nip are laminated at a pressure of about 80 pounds per linear inch. Simultaneously, the aluminum foil is embossed by the engraved chill roll, and the heat of the molten polyethylene is quickly conducted through the foil to the chill roll thereby causing the polyethylene to solidify. The embossed metal foil laminate is then parted from the engraved chill roll.

This Example may be repeated with similar success by substituting the generally described materials and concentrations for those recited in the Example. Although the Example illustrates a specific embodiment, it will be readily apparent to those ordinarily skilled in the art that the invention may be practiced otherwise than as specifically illustrated without departing from its spirit and scope.

What is claimed is:

1. A process for preparing an embossed metal foil laminate, comprising:

providing a web of paper;

providing a metal foil;

extrusion coating a layer of molten resin onto the web of paper;

contacting the metal foil to the layer of molten resin, to form a layered structure comprising consecutively, the web of paper, the layer of molten resin, and the metal foil; and passing the layered structure between a nip roll and an engraved chill roll, to laminate the layered structure, conduct heat from the molten resin quickly through the metal foil to the chill roll to solidify the resin, and emboss the metal foil.

2. The process for preparing an embossed metal foil laminate according to claim 1, wherein the paper is Kraft paper, natural pulp paper, synthetic pulp paper, paperboard, linerboard, cardboard, or a laminate thereof.

3. The process for preparing an embossed metal foil laminate according to claim 2, wherein the paper is Kraft paper.

4. The process for preparing an embossed metal foil laminate according to claim 1, wherein the thickness of the paper is from about 5 mils to about 300 mils.

5. The process for preparing an embossed metal foil laminate according to claim 4, wherein the thickness of the paper ranges from about 10 mils to about 100 mils.

6. The process for preparing an embossed metal foil laminate according to claim 1, wherein the metal foil is aluminum, stainless steel, tin, or an alloy thereof.

7. The process for preparing an embossed metal foil laminate according to claim 1, wherein the thickness of the metal foil is from about 0.0001 mil to about 1 mil.

8. The process for preparing an embossed metal foil laminate according to claim 7, wherein the thickness of the metal foil ranges from about 0.00015 mil to about 0.4 mil.

9. The process for preparing an embossed metal foil laminate according to claim 1, wherein the resin is high, medium, or low density polyethylene.

10. The process for preparing an embossed metal foil laminate according to claim 1, wherein the nip roll has a Durometer hardness from about 30 to about 75.

11. The process for preparing an embossed metal foil laminate according to claim 1, wherein the layered structure is laminated between the nip roll and the engraved chill roll at a pressure from about 10 to about 200 pounds per linear inch.

12. The process for preparing an embossed metal foil laminate according to claim 11, wherein the layered structure is laminated at a pressure from about 50 to about 150 pounds per linear inch.

13. The process for preparing an embossed metal foil laminate according to claim 1, wherein the temperature of the engraved chill roll is from about 65° F. to about 180° F.

14. The process for preparing an embossed metal foil laminate according to claim 1, wherein the layer of molten resin has a thickness from about 0.3 mil to about 5 mils.

15. The process for preparing an embossed metal foil laminate according to claim 1, wherein the process is conducted at a running speed from about 100 feet per minute to about 1,000 feet per minute.

16. The process for preparing an embossed metal foil laminate according to claim 15, wherein the running speed ranges from about 500 feet per minute to about 700 feet per minute.

17. A process for preparing an embossed aluminum foil laminate comprising:
    providing a web of Kraft paper having a thickness from about 5 mils to about 300 mils;
    providing aluminum foil having a thickness from about 0.0001 mil to about 1 mil;
    extrusion coating a layer of molten high, medium, or low density polyethylene resin onto the web of Kraft paper, said molten resin layer having a thickness from about 0.3 mil to about 5 mils;
    contacting the aluminum foil to the layer of molten polyethylene resin, to form a layered structure comprising, consecutively, the web of Kraft paper, the layer of molten polyethylene resin, and the aluminum foil; and
    passing the layered structure between a nip roll and an engraved chill roll, the Durometer hardness of the nip roll being from about 30 to about 75 and the temperature of the engraved chill roll being from about 65° F. to about 180° F., to laminate the layered structure at a pressure from about 10 to about 200 pounds per linear inch, conduct heat from the molten polyethylene resin quickly through the aluminum foil to the chill roll to solidify the polyethylene resin, and emboss the aluminum foil.

18. The process for preparing an embossed aluminum foil laminate according to claim 17, wherein said process is conducted at a running speed from about 100 feet per minute to about 1,000 feet per minute.

19. The process for preparing an embossed aluminum foil laminate according to claim 18, wherein said process is conducted at a running speed from about 500 feet per minute to about 700 feet per minute.

20. A process for preparing an embossed aluminum foil laminate, comprising:
    providing at a running speed from about 500 to about 700 feet per minute a web of Kraft paper having a thickness from about 10 to about 100 mil;
    providing, at the same running speed as that of the web of Kraft paper, an aluminum foil having a thickness from about 0.00015 to about 0.4 mil;
    extrusion coating a layer of high, medium, or low density polyethylene resin onto the web or Kraft paper, said molten resin layer having a thickness from about 0.3 to about 5 mils;
    contacting the aluminum foil to the layer of molten polyethylene resin, to form a layered structure comprising, consecutively, the web of Kraft paper, the layer of molten polyethylene resin, and the aluminum foil; and
    passing the layered structure between a nip roll and an engraved chill roll, the Durometer hardness of the nip roll being from about 30 to about 75 and a temperature of the engraved chill roll being from about 65° F. to about 180° F., to laminate the layered structure at a pressure from about 50 to about 150 pounds per linear inch, conduct heat from the molten polyethylene resin quickly through the aluminum foil to the chill roll to solidify the polyethylene resin, and emboss the aluminum foil.

* * * * *